(12) United States Patent
Boicey et al.

(10) Patent No.: US 8,015,159 B2
(45) Date of Patent: Sep. 6, 2011

(54) SYSTEM AND METHOD FOR REAL-TIME MEDIA SEARCHING AND ALERTING

(75) Inventors: Trevor Nelson Boicey, Ottawa (CA); Christopher James Johnson, Ottawa (CA)

(73) Assignee: DNA 13 Inc., Ottawa, Ontario (CA)

( * ) Notice: Subject to any disclaimer, the term of this patent is extended or adjusted under 35 U.S.C. 154(b) by 919 days.

(21) Appl. No.: 11/947,460

(22) Filed: Nov. 29, 2007

(65) Prior Publication Data
US 2008/0072256 A1   Mar. 20, 2008

Related U.S. Application Data

(63) Continuation of application No. 11/063,559, filed on Feb. 24, 2005, now abandoned.

(60) Provisional application No. 60/546,954, filed on Feb. 24, 2004.

(51) Int. Cl.
*G06F 17/30* (2006.01)

(52) U.S. Cl. ...................................... 707/661

(58) Field of Classification Search ................. 707/661, 707/755, 792; 725/19, 37, 38, 46, 112, 136, 725/139; 370/509; 386/112, 241, 245, 252, 386/122
See application file for complete search history.

(56) References Cited

U.S. PATENT DOCUMENTS

| | | | |
|---|---|---|---|
| 3,760,275 A | 9/1973 | Ohsawa et al. |
| 4,792,864 A | 12/1988 | Watanabe et al. |
| 4,975,770 A | 12/1990 | Troxell |
| 5,157,491 A | 10/1992 | Kassatly |
| 5,231,494 A | 7/1993 | Wachob |
| 5,313,297 A | 5/1994 | Fukui et al. |
| 5,636,346 A | 6/1997 | Saxe |
| 5,717,878 A | 2/1998 | Sannino |
| 5,847,760 A | 12/1998 | Elmaliach et al. |
| 5,892,554 A | 4/1999 | DiCicco et al. |
| 5,986,692 A | 11/1999 | Logan et al. |
| 5,999,970 A | 12/1999 | Krisbergh et al. |

(Continued)

FOREIGN PATENT DOCUMENTS
WO   WO9627840   9/1996

*Primary Examiner* — Diane Mizrahi
(74) *Attorney, Agent, or Firm* — Shin Hung; Borden Ladner Gervais LLP

(57) ABSTRACT

A method and system for continually storing and cataloguing streams of broadcast content, allowing real-time searching and real-time results display of all catalogued video. A bank of video recording devices store and index all video content on any number of broadcast sources. This video is stored along with the associated program information such as program name, description, airdate and channel. A parallel process obtains the text of the program, either from the closed captioning data stream, or by using a speech-to-text system. Once the text is decoded, stored, and indexed, users can then perform searches against the text, and view matching video immediately along with its associated text and broadcast information. Users can retrieve program information by other methods, such as by airdate, originating station, program name and program description. An alerting mechanism scans all content in real-time and can be configured to notify users by various means upon the occurrence of a specified search criteria in the video stream. The system is preferably designed to be used on publicly available broadcast video content, but can also be used to catalog private video, such as conference speeches or audio-only content such as radio broadcasts.

17 Claims, 8 Drawing Sheets

U.S. PATENT DOCUMENTS

| | | |
|---|---|---|
| 6,061,056 A | 5/2000 | Menard et al. |
| 6,157,809 A | 12/2000 | Kambayashi |
| 6,160,988 A | 12/2000 | Shroyer |
| 6,188,436 B1 | 2/2001 | Williams et al. |
| 6,226,030 B1 | 5/2001 | Harvey et al. |
| 6,266,094 B1 | 7/2001 | Taylor, Jr. |
| 6,320,917 B1 | 11/2001 | Stott et al. |
| 6,397,041 B1 | 5/2002 | Ballard et al. |
| 6,546,556 B1 | 4/2003 | Kataoka et al. |
| 6,606,128 B2 | 8/2003 | Hanafee et al. |
| 2001/0023498 A1 | 9/2001 | Cosmao et al. |
| 2001/0049820 A1 | 12/2001 | Barton |
| 2002/0056093 A1 | 5/2002 | Kunkel et al. |
| 2002/0120925 A1 | 8/2002 | Logan |
| 2002/0129381 A1 | 9/2002 | Barone et al. |
| 2002/0133816 A1 | 9/2002 | Greene et al. |
| 2002/0152463 A1 | 10/2002 | Dudkiewicz |
| 2002/0157113 A1 | 10/2002 | Allegrezza |
| 2003/0033603 A1 | 2/2003 | Mori et al. |
| 2003/0140342 A1 | 7/2003 | Hasebe et al. |
| 2003/0163830 A1 | 8/2003 | Nam |
| 2003/0229900 A1* | 12/2003 | Reisman .................. 725/87 |
| 2004/0031058 A1* | 2/2004 | Reisman .................. 725/112 |
| 2005/0273828 A1 | 12/2005 | Barton |

* cited by examiner

| | Support | Admin | Logout |

| Home | Monitoring |

[ Broadcast Search ] | Saved Searches | Browse Program Guide | Search Program Guide Results for: Example Search     [ Change ]  [ Delete ]

Tuesday, February 17th, 2004

ABCD News                                                    ▭▬ - 60%
2004-02-17, 4:40 PM Text1, text2, text 3, text4, text5. Text1, text2, text 3, text4, text5. Text1, text2, text 3, text4, text5. Text1, text2, text 3, text4, text5. Text1, text2, text 3, text4, text5. Text1, text2, text 3, text4, text5. Text1, text2, text 3, text4, text5.

Monday Report                                                ▭▬ - 54%
2004-02-17, 4:16 PM Text1, text2, text 3, text4, text5. Text1, text2, text 3, text4, text5. Text1, text2, text 3, text4, text5. Text1, text2, text 3, text4, text5. Text1, text2, text 3, text4, text5. Text1, text2, text 3, text4, text5. Text1, text2, text 3, text4, text5.

Financial Times Today                                        ▭▬ - 46%
2004-02-17, 4:11 PM Text1, text2, text 3, text4, text5. Text1, text2, text 3, text4, text5. Text1, text2, text 3, text4, text5. Text1, text2, text 3, text4, text5. Text1, text2, text 3, text4, text5.

News at Six                                                  ▭▬ - 36%
2004-02-17, 3:58 PM Text1, text2, text 3, text4, text5. Text1, text2, text 3, text4, text5. Text1, text2, text 3, text4, text5

Local News                                                   ▭▬ - 14%
2004-02-17, 3:40 PM Text1, text2, text 3, text4, text5. Text1, text2, text 3, text4, text5. Text1, text2, text 3, text4, text5. Text1, text2, text 3, text4, text5. Text1, text2

Alert: [Off] Normal Urgent

Results 11-15 of 2914: ◀ Page 3 of 583 ▶ ▶▶

Figure 7

|                                    | Support | Admin | Logout |
|---|---|

| Home | Monitoring |

[ Broadcast Search]  |  Saved Searches  |  Browse Program Guide  | Search Program Guide ◀◀ ( View ) ▶▶

| 8:59 PM | The quick brown fox jumps over the lazy dog. The quick brown fox jumps over the lazy dog. The quick brown fox jumps over the lazy dog. | Channel: ABCD<br>Program: Lorem Ipsum<br>Date: 2004-01-11<br>Time: 9:00 PM |
|---|---|---|
|  | The quick brown fox jumps over the lazy dog. The quick brown fox jumps over the lazy dog. The quick brown fox jumps over the lazy dog. | Video in Point    Video Out Point<br>   8:59 PM               9:00 PM<br>(Lock Clip Start)  (Lock Clip End) |
| 9:00 PM | The quick brown fox jumps over the lazy dog. The quick brown fox jumps over the lazy dog. | Clip Length: 1 minute<br>Clip Size: approximately 1.8 MB<br>(View Clip)  (Save Clip) |

◀◀ ( View ) ▶▶

Figure 8

SYSTEM AND METHOD FOR REAL-TIME MEDIA SEARCHING AND ALERTING

CROSS REFERENCE TO RELATED APPLICATIONS

This application is a continuation of U.S. patent application Ser. No. 11/063,559 filed on Feb. 24, 2005, which claims priority from U.S. Provisional Patent Application Ser. No. 60/546,954, filed Feb. 24, 2004, which is incorporated herein by reference in its entirety.

FIELD OF THE INVENTION

The present invention relates generally to media monitoring systems. More particularly, the present invention relates to video media searching and alerting systems.

BACKGROUND OF THE INVENTION

Many businesses and organizations have an interest in what is being broadcast, but the volume of information available makes it prohibitive to monitor completely.

The overwhelming majority of broadcast sources include closed captions, which have been used successfully to identify the subject matter of a video stream. Systems have been developed to monitor and act upon the closed captioned text. For example, such systems trigger on the basis of keywords and selectively record video for later viewing. However, no refinement or cross-referencing could be performed on past video, and new searches would only be applied to subsequent video broadcasts.

U.S. Pat. No. 5,481,296 is directed to a scanning method of monitoring video content using a predefined set of keywords. Based on a keyword, the system has the ability to monitor multiple streams and to return reception devices in real-time to selectively capture the matching video. The described system also attempts to selectively save video that has matched while removing segments that have not matched. The goal is to selectively record only the video that is desired.

U.S. Pat. No. 5,986,692 is directed to a system for generating a custom-tailored video stream. The system is designed to work unattended, watching video signals, extracting and collating those that are deemed to be of interest to a specific user. The system also defines filters that attempt to detect and discern specific components of a video signal that are unwanted. For example, opening credits are video components that are typically undesired.

U.S. Pat. No. 6,061,056 is directed to a system that automatically monitors a video stream for desired content. Users enter their search parameters, and the system watches the applied video streams for matches. However, this system only records video when a match occurs. The user is then presented with a series of clips that were saved based on their matches. Any new searches or refinements to the query only take effect for future searches. As well, any desired content that was not caught by the programmed search is lost forever. As an example, a user search for "Company A" may produce a result announcing a surprise merger of "Company A" and "Company B". With the system as described in U.S. Pat. No. 6,061, 056, new searches for "Company B" will only take effect on video occurring after the user adds this search. Therefore, the system is incapable of searching for any records prior to the new search being executed, such as recent happenings leading up to the merger.

U.S. Pat. No. 6,266,094 is directed to a system of aggregating and distributing closed caption text over a distributed system. The system focuses on extensive scrubbing and preparation of closed caption text to enhance usability. However, the described system has no facility for archiving the video associated with the clip, nor does it present the program text to the user.

It is, therefore, desirable to provide a media monitoring system that can dynamically search archived media content and real-time media content with unlimited queries.

SUMMARY OF THE INVENTION

It is an object of the present invention to obviate or mitigate at least one disadvantage of previous media monitoring systems. In particular, it is an object of the present invention to provide a system and method for conducting real-time searches of recorded video, by comparing extracted closed captioned text of the video to predefined search parameters. Selected video segments time indexed to closed captioned text segments can be selectively viewed. The system searches real-time video and archived video.

In a first aspect, the present invention provides a media monitoring system for receiving at least one video channel having corresponding closed captioned text in real time. The media monitoring system includes a media management system and a user access system. The media management system continuously stores all the data of the at least one video channel locally and extracts the corresponding closed captioned text into decoded text. The decoded text is provided to a global storage database. The media management system further includes a search engine for comparing the decoded text against search terms to provide matching results, and an indexing engine for indexing units of the decoded text by time. The user access system receives and displays the matching results, and transmits a request for stored data corresponding to specific units of the decoded text from the media management system. The media management system then provides said stored data corresponding to specific units of the decoded text in response to the request.

According to embodiments of the first aspect, the media management system can include a media server pod, an index server and a web server. The media server pod receives the at least one video channel and locally stores the data of the at least one video channel. The media server pod can include a close caption decoder for extracting the corresponding closed captioning text into the decoded text. The index server receives the decoded text from the media server pod over a first network, and includes the index engine. The web server includes the global storage database for storing the decoded text received from the index servers over a second network. The web servers can include the search engine and a search term database for storing the search terms. The media server pod can include at least one media source for providing the at least one video channel, and a media server in direct communication with the at least one media source. The media server receives the at least one video channel, and has a decoder for extracting the corresponding closed captioned text into decoded text from a vertical blanking interval of the at least one video channel. The media server can further include mass storage media for storing the data of the at least one video channel.

In aspects of the present embodiment, the media server can include a parser for generating the stored data corresponding to specific units of the decoded text, and the media server pod can include a plurality of media sources for providing a corresponding number of video channels. The media server can include a video/audio compression system for compressing the data of the at least one video channel prior to storage onto the mass storage media.

According to further aspects of the present embodiment, the media server can include a speech-to-text system for converting audio signals corresponding to the at least one video channel into text, and a text detector for detecting an absence of the corresponding closed captioned text, such that the text detector generates an alert indicating the absence of the corresponding closed captioned text. In yet other aspects, the media source can include one of a satellite receiver, a cable box, an antenna, and a digital radio source. The index server can include the global storage database, or the web server can include the global storage database.

According to yet another embodiment of the present aspect, the first network can include a wide area network. The media management system can further include a second media server pod for receiving data of a different video channel, where the second media server pod is in communication with the first network. The media server pod and the second media server pod can be geographically distant from each other.

In further embodiments of the present aspect, the user access system can include a duplicate video clip detector for identifying the matching results that are duplicates of each other, and a user access device in communication with the web server over a third network for receiving and displaying the matching results. The user access device can provide the search terms to the media management system. In an aspect of the present embodiments, the user access system can include a fourth network in communication with the user access device and the media server pod, where the user access device receives said stored data corresponding to specific units of the decoded text in response to the request over the fourth network.

In a second aspect, the present invention provides a method for searching video data corresponding to at least one video channel collected and stored in a media monitoring system. The method includes (a) providing search terms; (b) comparing the search terms to stored closed captioned text corresponding to the video data, the closed captioned text being indexed by channel and time; (c) displaying matching results from the step of comparing; (d) requesting selected video data corresponding to one of the matching results; and (e) providing the selected video data corresponding to one of the matching results.

In an embodiment of the present aspect, the step of requesting includes selecting a time indexed segment of the closed captioned text of one of the matching results, the step of selecting includes setting a video start time and a video end time for the selected time indexed segment, and the step of providing the selected video data includes parsing the video data to correspond with the selected time indexed segment to provide the selected video data. The step of providing search terms can include storing the search terms. In yet another embodiment of the present aspect, the search terms are provided to a web server over a first network, where the web server executes the step of comparing and providing the matching results to a user access device for display over the first network. The step of providing the video data includes transferring the video data over a second network to the user access device, and the step of providing the video data can include parsing the video data to provide the portion of the video data.

In a third aspect, the present invention provides a method for automatic identification of video clips matching stored search terms. The method includes (a) continuously receiving and locally storing video data corresponding to at least one video channel in real time; (b) extracting and globally storing the closed captioned text from the video data; (c) indexing the closed captioned text by channel and time; (d) comparing the stored closed captioned text to the stored search terms; and, (e) providing match results of the closed captioned text matching the search terms, each match result having an optionally viewable video clip.

According to an embodiment of the present aspect, the method can further include the steps of displaying the match results on a user access device, requesting the video clip corresponding to a selected match result, and displaying the video clip on the user access device. The step of requesting includes viewing the closed captioned text corresponding to the selected match result with time indices, setting a video start time and a video end time, and, providing a request having the video start time and the video end time, and channel information corresponding to the selected match result. The step of displaying the video clip includes receiving the request, and parsing the video data to provide the video clip having the video start time and the video end time.

According to another embodiment of the present aspect, the video data is compressed prior to being stored, the extracted closed captioned text is transmitted over a first network to an indexing server for indexing the closed captioned text by channel and time, the closed captioned text is transmitted over a second network for storage on a web server, the step of comparing is executed on the web server. The match results can be transmitted over a third network to a user access device. and the step of displaying the video clip includes transmitting the video clip over a fourth network to the user access device.

According to yet another embodiment of the present aspect, the step of comparing includes (i) providing a segment of the closed captioned text, (ii) iteratively obtaining search terms from the stored search terms for comparing to the segment of the closed captioned text until all of the stored search terms have been compared to the segment of the closed captioned text, and (iii) storing details of all matches to the stored search terms as the match results. The step of storing includes selectively generating an alert when the segment of the closed captioned text matches the stored search terms, the step of selectively generating includes generating the alert only when the matching search term has an associated alerting status, and the alert can include one of in-system alerts, mobile device activation, pager activation and automatic email generation.

According to a further embodiment of the present aspect, the step of extracting includes detecting an absence of the closed captioned text from the video data, and generating an alert message when no closed captioned text is detected.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5 is a computer screen user interface for prompting search parameters from a user;

FIG. 6 is a computer screen user interface showing compact example results from a search;

FIG. 7 is a computer screen user interface showing detailed example results from a search;

FIG. 8 is a computer screen user interface showing matching captioning and timing information; and, FIG. 9 is a flow chart illustrating an automatic scanning mode of the media monitoring system of the present invention.

DETAILED DESCRIPTION

Generally, the present invention provides a method and system for continually storing and cataloguing streams of broadcast content, allowing real-time searching and real-time results display of all catalogued video. A bank of video recording devices store and index all video content on any number of broadcast sources. This video is stored along with the associated program information such as program name, description, airdate and channel. A parallel process obtains the text of the program, either from the closed captioning data stream, or by using a speech-to-text system. Once the text is decoded, stored, and indexed, users can then perform searches against the text, and view matching video immediately along with its associated text and broadcast information.

Users can also retrieve program information by other methods, such as by airdate, originating station, program name and program description. Additionally, an alerting mechanism scans all content in real-time and can be configured to notify users by various means upon the occurrence of a specified search criteria in the video stream. The system is preferably designed to be used on publicly available broadcast video content, but can also be used to catalog private video, such as conference speeches or audio-only content such as radio broadcasts.

The system according to the embodiments of the present invention non-selectively records all video/audio applied to it, and allows user searches to review all video on the system. Only under user control is a presentation clip prepared and retrieved. Furthermore, searches can be performed at any time to examine archived video, rather than searches being the basis by which video is saved. Video is only shown to the user that they specifically request, and any editing can be done under user control.

Figure 1:
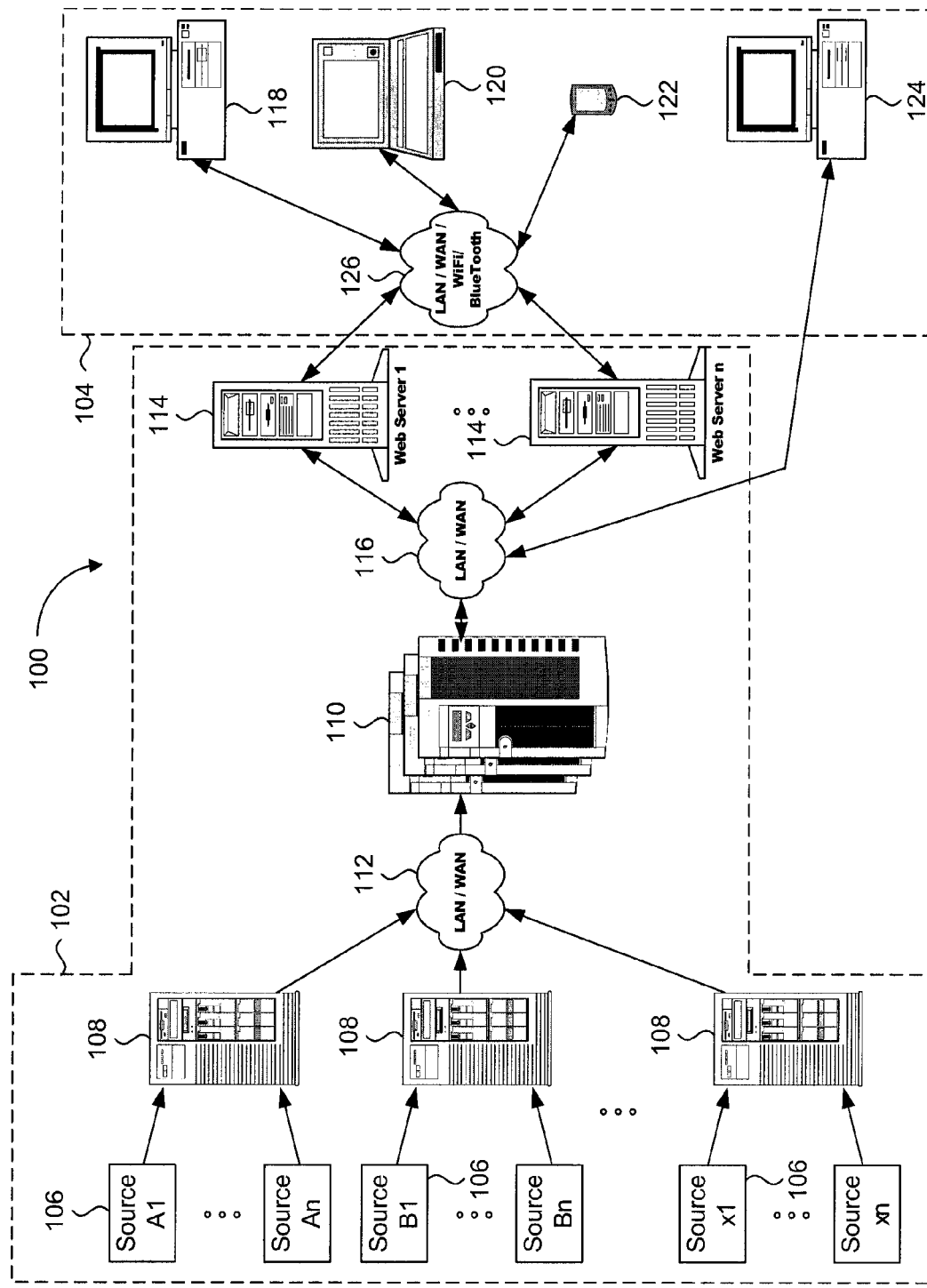
FIG. 1 is a schematic of the media monitoring system according to an embodiment of the present invention.

A general block diagram of a media monitoring system according to an embodiment of the present invention is shown in FIG. 1. Media monitoring system 100 comprises two major component groups. The first is the media management system 102, and the second is a user access system 104.

The media management system 102 is responsible for receiving and archiving video and its corresponding audio. Preferably, the video and audio data is continuously received and stored. Video streams are tuned using media sources 106 such as satellite receivers, other signal receiving devices such as cable boxes, antennas, and VCR's or DVD players. Alternately, media sources 106 can include non-video media sources, such as digital radio sources, for example. Preferably, the media sources 106 receive digital signals. The video signal, corresponding audio, and any corresponding closed-captioned text, is captured by video/audio capture hardware/software stored on media servers 108. The video/audio data can be stored in any sized segment, such as in one-hour segments, with software code to later extract any desired segment of any size by channel, start time, and end time. Those of skill in the art will understand that the video/audio data can be stored in any suitable format. As shown in FIG. 1, media management system 102 can include any number of media servers 108, and each video server can be in communication with any number of media sources 106. If storage space is limited, the media servers can compress the digital data from the media sources 106 into smaller file sizes. The data from media sources 106 are stored in consecutive segments onto a mass storage device using uniquely generated filenames that encode the channel and airdate of the video segment. If the data is a video stream, closed-captioned text is extracted from the video stream and stored in web servers 114 as searchable text, as will be discussed later. The extracted closed-captioned text is indexed to its corresponding video/audio clips stored in the media servers 108.

The media management system 102 stores all of the text associated with the video stream. In most cases, this text is obtained from the closed-captioning signal encoded into the video. The media management system 102 can further include a closed-captioned text detector for detecting the absence of closed-captioned text in the data stream, in order to alert the system administrator that closed-captioned text has not been detected for a predetermined amount of time. In a situation where closed-captioned text is undetected, the aforementioned alert can notify the system operator to take appropriate action in order to resolve the problem. In some cases, the stream may not be a digital stream, and the system can include a speech-to-text system to convert the audio signals into text. Accordingly, these sub-systems can be executed within each media server 108. The extracted text is broken into small sections, preferably into one-minute segments. Each clip is then stored in a database along with the program name, channel, and airdate of the clip. The text is also pushed into an indexing engine of index servers 110, which allows it to be searched. In a preferred embodiment, the closed captioned text spanning a preset time received by index servers 110 are converted to XML format, bundled, and sent to web servers 114 for global storage via network 116. Web servers 114 can execute the searches for matches between user specified terms and the stored closed captioned text, via a web-based search interface. Alternately, the closed captioned text can be stored in index servers 110. The channel and airdate fields of the text segment allow it to be matched to a video clip stored by the media management system 102 as needed. Further details of media management system 102 will be described later.

Although not shown in FIG. 1, the media management system 102 includes an alerting system. This system watches for each closed captioned segment that is indexed and cross-references it against the stored list of user defined alerts. Any matches will trigger user alerts to notify the user that a match has occurred. Alerts can include in-system alerts, mobile device activation, pager activation, automatic email generation, which can be generated from web servers 114.

The user access system 104 can include access devices such as a computer workstation 118, or mobile computing devices such as a laptop computer 120 and a PDA 122. Of course, other wireless devices such as mobile phones can also be used. These web enabled access devices can communicate with the web servers 114 via the Internet 126 wirelessly through BlueTooth or WiFi network systems, or through traditional wired systems. Optionally, users can dial up directly to the network 116 with a non-web search interface enabled computer 124. As will be shown later in FIG. 3, the user access system 104 further includes an alternate data transfer path for transferring video data to the access devices to reduce congestion within media management system 102. As previously discussed, each web server 114 can store identical copies of the closed captioned text bundle received from index servers 110. This configuration facilitates searches conducted by users since the text data is quickly accessible, and search results consisting of closed captioned text can be quickly forwarded to the user's access device.

From user access system 104, the user can search for occurrences of keywords, retrieve video by date and time, store alert parameters, etc. The user interface software can take the form of a web interface, locally run software, mobile device interface, or any other interactive form.

The back end portion of the web interface maintains a connection to the text database, as well as to the index of video streams. Depending on configuration, the user interface software can be used to stream video to the user, or alternatively, to direct the user to an alternate server where video will be presented.

The previously described embodiment of the invention can be deployed locally, at a single site for example, to monitor all the media channels of interest. Therefore, networks 112 and 116 can be implemented as a local area network (LAN), such as in an office building for example. Local area networks typically provide high bandwidth operation. Alternately, media monitoring system 100 can be deployed across a wide network, meaning that the components of the system can be geographically dispersed, making networks 112 and 116 wide area networks (WAN). The bandwidth of a WAN is generally smaller than that of a LAN. Of course, those of skill in the art will understand that the presently described system can be implemented with a combination of WAN and LAN.

In a wide deployment embodiment of the invention, media servers 108 and their corresponding media sources 106 can be geographically distributed to collect and store local video, which is then shared within the system. For example, "pods" of media servers 108 and their corresponding media sources 106 can be located in different cities, and in different countries. As such, it is advantageous to store the relatively large video/audio data locally within respective media servers 108. In such an embodiment, the server the user is connected to may not physically be at the location where the video streams are being recorded. In the present context, the distributed media server pods are considered remotely connected to index servers 110, since they are connected via a WAN. However, an advantage of the present invention is that the monitoring and notification speed remains fast regardless of the network configuration of the media monitoring system 100. This is due to the fact that the small sized closed captioned text can be rapidly transferred within the system, and more particularly, between the media servers 108 and the user access devices.

Once the user desires to view corresponding video, then the larger video data is accessed and sent to the user. Due to the size of the video, it is preferable to avoid congesting the networks 112, 116 and 126 and limiting performance for all users. However, video may be transferred to the user in an all-LAN environment with satisfactory speed. In a system implementation with relatively high bandwidth, the user access device connects to index servers 110, which functions as the conductor of traffic between media servers 108 and the user access device. Therefore, according to another embodiment of the invention, requested video can be directly sent from the appropriate media server 108 to the video enabled user access device.

Figure 2:
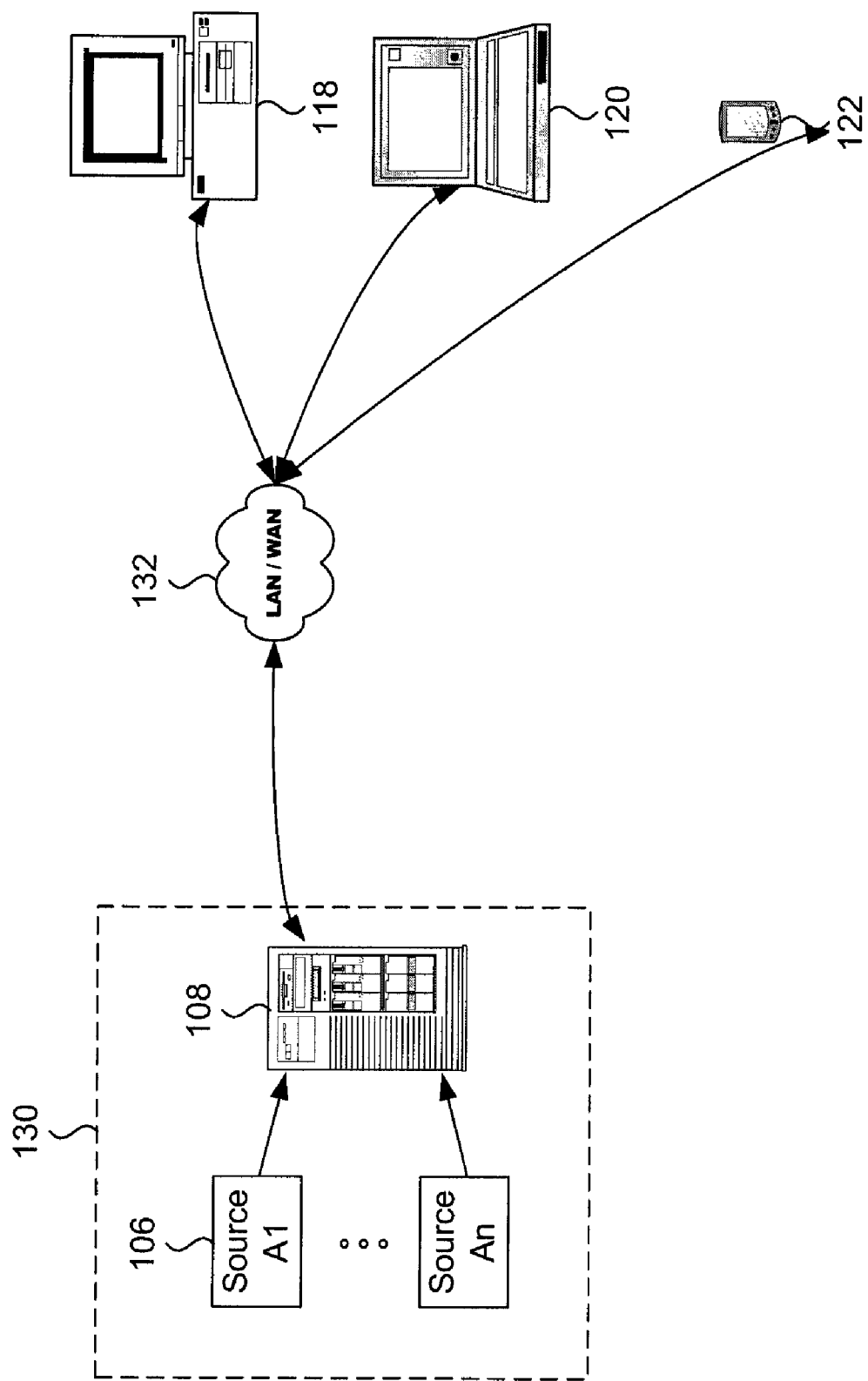
FIG. 2 is a schematic of the media monitoring system according to another embodiment of the present invention.

FIG. 2 illustrates the configuration of the media monitoring system 100 when video data is to be transferred to a user access device in a geographically distributed system. In the present example, one video server 108 and its corresponding media sources 106 represent a single video processing unit of a pod of video processing units 130, that may be deployed in a particular city and geographically distant from index servers 110 and network 112. The pod 130 remains in communication with remote access devices 118, 120 and 122 via LAN/WAN network 132, which may be geographically distant from pod 130. Hence, once a user requests a particular video clip, the request is sent directly to the appropriate video server 108, which then transfers the requested video clip, parsed as requested by the user, to their access device via WAN/LAN network 132. Media server 108 can include a parser for providing the requested video clip that corresponds with the time-indexed closed captioned text. Since the video clips are received through a path outside of the media management system 102 and user access system 104, the potential for congestion of data traffic within the system is greatly reduced. At the same time, multiple users can receive their respective requested video clips rapidly.

In general operation, when a user specifies key search terms through their computer or wireless device, the index servers will search the archived closed captioned text, and notify the user if any matches have occurred. Matches are displayed with the relevant bibliographic information such as air date and channel. The user then has the option of viewing and hearing a time segment of the videos containing the matched terms, the time segment being selectable by the user. The search of key terms can extend to future broadcasts, such that the search is conducted dynamically in real-time. Thus, the user can be notified shortly after a search term has been matched in a current broadcast. Since the video broadcast is recorded, the user can selectively view the entire broadcast, or any portion thereof.

Figure 3:
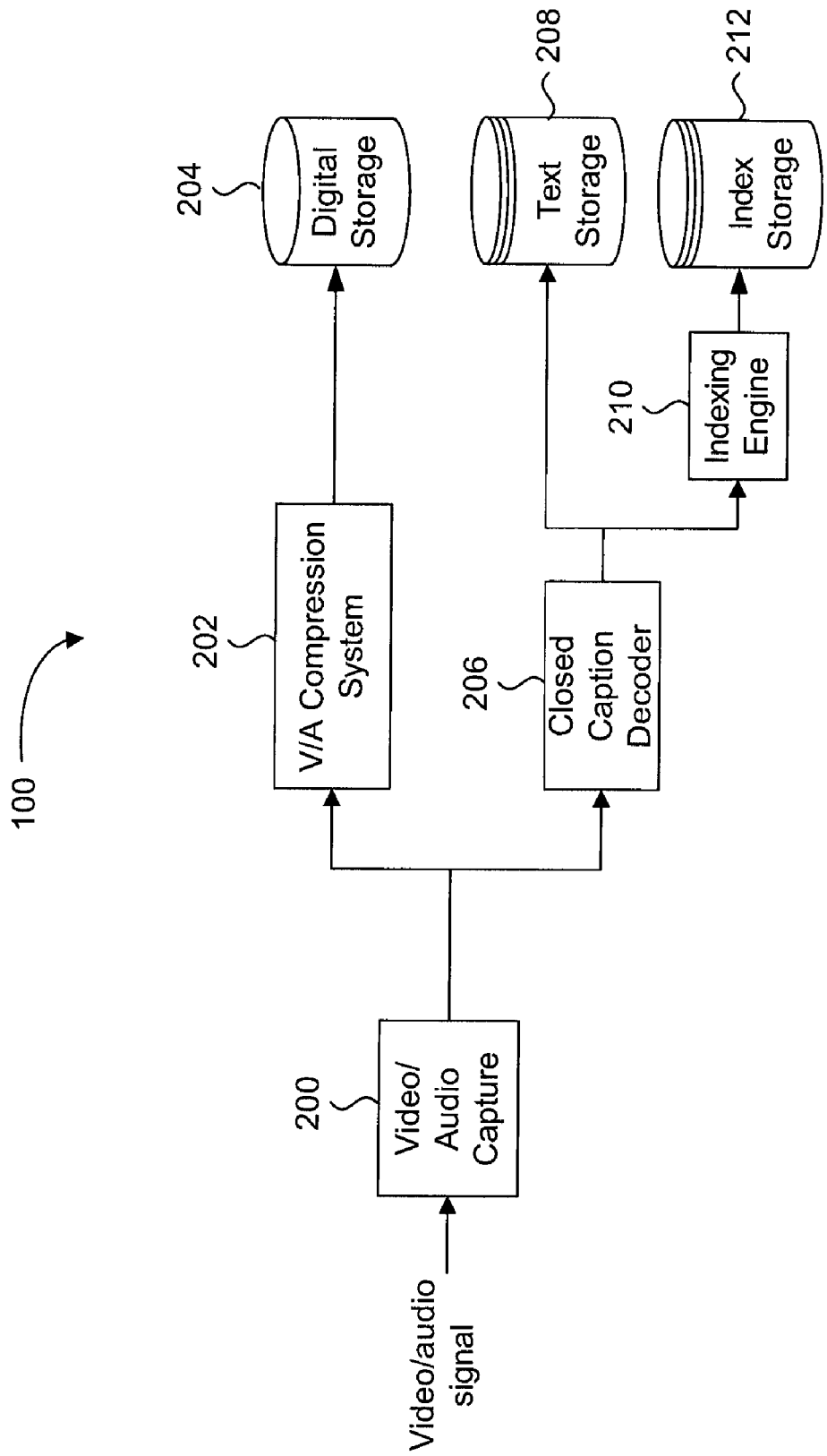
FIG. 3 is a block diagram of the functional components of the media monitoring system shown in FIG. 1.

FIG. 3 illustrates a block diagram of the general functional components of media monitoring system 100 shown in FIG. 1.

The media monitoring system 100 converts a video signal to an indexed series of digital files on a mass storage system, which can then be retrieved by specifying the desired channel, start time, and end time. This capability is then used to supply the actual video that matches the search result from the user interface component. Video is archived at a specified quality, depending on operator configuration. Higher quality settings allow for larger video frames, higher frame rates, and greater image detail, but with a penalty of greater file storage requirements. All parameters are configurable by the operator at the system level. As previously mentioned, the video/audio signal to be archived is made available from an external source. In practice, this usually consists of an antenna, or a satellite receiver or cable feed supplied by a signal provider. Any standard video signal may be used, although the originating device preferably supports encoding of closed-captions in the Vertical Blanking Interval (VBI), which is the dead time where the scanning gun of the monitor finishes at the bottom and moves back to the top of the screen. The system can also be configured to store audio-only content should the signal not have a video component.

The video/audio signal is applied to the input of a video capture device 200, which, either through a hardware or a software compression system 202, converts the video signal to a digital stream. In FIG. 1, video capture device 200 and software compression system 202 can be implemented in media servers 108. The exact format of this stream can be specified by the operator, but is typically chosen to be a compressed stream in a standard format such as MPEG or AVI formatted video. The video capture process outputs a continuous stream of video, which is then divided into manageable files. According to an embodiment of the present invention, the files are preferably limited to one hour blocks of video. These files are then stored on a mass storage system 204 within their respective media servers 108, indexed by the channel they represent, and the block of time that the video recording was done. Accordingly, mass storage system 204 locally stores the video/audio data for its corresponding media sources 106.

Video clips can be retrieved from mass storage system 204 in response to retrieval requests from permitted machines. These requests would be generated from servers that are serving users who have requested a video clip. From the users standpoint, this video clip is chosen by its content, but the system would know it as belonging to a specified channel for a given period of time. Most user clip requests are for small segments of video, an example being "CBC-Ottawa, 5:55pm-5:58pm". The archive system, using the channel and the date required, first deduces which large file the video segment is located in. It then parses the video file to locate and extract the stream data representing the segment selected. The stream data is then re-encapsulated to convert it to a stand-alone video file, and the result is returned to the calling machine, ultimately to be delivered to the user.

Since storage space is finite, the system can continuously replace the oldest video streams in its archive with the newest. This ensures that as much video is stored as possible. Additional storage can be added or removed as needed.

Media monitoring system 100 can include self monitoring functions to ensure robust operation, and to minimize potential errors. For example, the video digitizing process has the ability to detect the lack of video present at its input. This condition will raise an operator alert to allow the operator to locate the cause of the outage. In the field, this can be attributed to cabling problems, weather phenomena, hardware failure, upstream problems, etc. In certain cases the system can be configured to attempt an automatic repair, by restarting or re-initializing a process or external device.

The closed captioned text associated with the video is preferably extracted from the closed captioning stream in the video signal, or an associated speech-to-text device. If closed captioning data is available in the video signal, the signal is applied to a decoder 206 typically located in each media server 108, that can read the VBI stream. The decoder 206 extracts the closed captions that are encoded into the video signal. In practice, this can be the same device performing the video compression, and the extraction can be done in software. If closed captioning data is not available, the audio stream is fed into a speech-to-text device instead of decoder 206, and the resulting text is fed into the system. This option can be used if the content is not a video signal, such as a commercial radio stream or recorded speech. The decoder 206 includes a buffer, into which text accumulates at "human reading" speed. After a short increment of time, preferably one minute, the text buffer is stored into text database 208 along with the channel and time information associated with the clip. This database 208 then contains a complete record of all text that has flowed through the system, sorted by channel and airdate. As previously mentioned, database 208 can be located within either index servers 110 or web servers 114. In either case, database 208 functions as global storage of the decoded closed captioned text.

To facilitate and accelerate searching, the program text is provided to an indexing engine 210. Indexing engine 210, implemented in index servers 110 receives a block of text, which in this case represents a small unit of video transcript (typically one minute), and stores it in a format that is optimized for full text searches. For practical implementation purposes, standard off-the-shelf products can be employed for the indexing function. According to the presently described embodiments, the video captions are indexed by channel and time for example. The formatted text is stored in index database 212, which can be located in index servers 110 or web servers 114. Database 212 can also function as global storage of all the formatted text.

For searching the text database 208, the user's search string is submitted to a full text search engine that searches database 212. Any results returned from this engine also contain indexes to the corresponding channel and time of the airing. Furthermore, since the entire text is stored in database 208, it can be retrieved using standard techniques to search on the channel and air time. It is noted that database 212 is used for full text searching, while database 208 has been formatted such that the data is ordered by time and channel to facilitate look up by time and channel.

Due to the small size of text streams, all extracted text could be retained for as long as required, even after its corresponding video clip has been deleted. The cleanup thread of the text system removes the captions from the database and the search index as they expire from the archival service. Alternatively, they may be retained as long as desired but are flagged to indicate that the associated video is no longer available. Additional search options allow searches to include this "archived" text if desired.

Once video data has been received, processed and archived in media management system 102 as previously described, user-defined searches can be executed through user access system 104. Operating upon each access device is a user search interface that provides the functionality of the system. The interface is designed to allow users with minimal training to be able to perform text searches, examine the program text that matches, and selectively view or archive the video streams where the captioning appeared. While the reference application is a web-based system, the system can be searched through other means, such as mobile WiFi devices, Bluetooth-enabled devices, and locally running software, for example.

Figure 4:
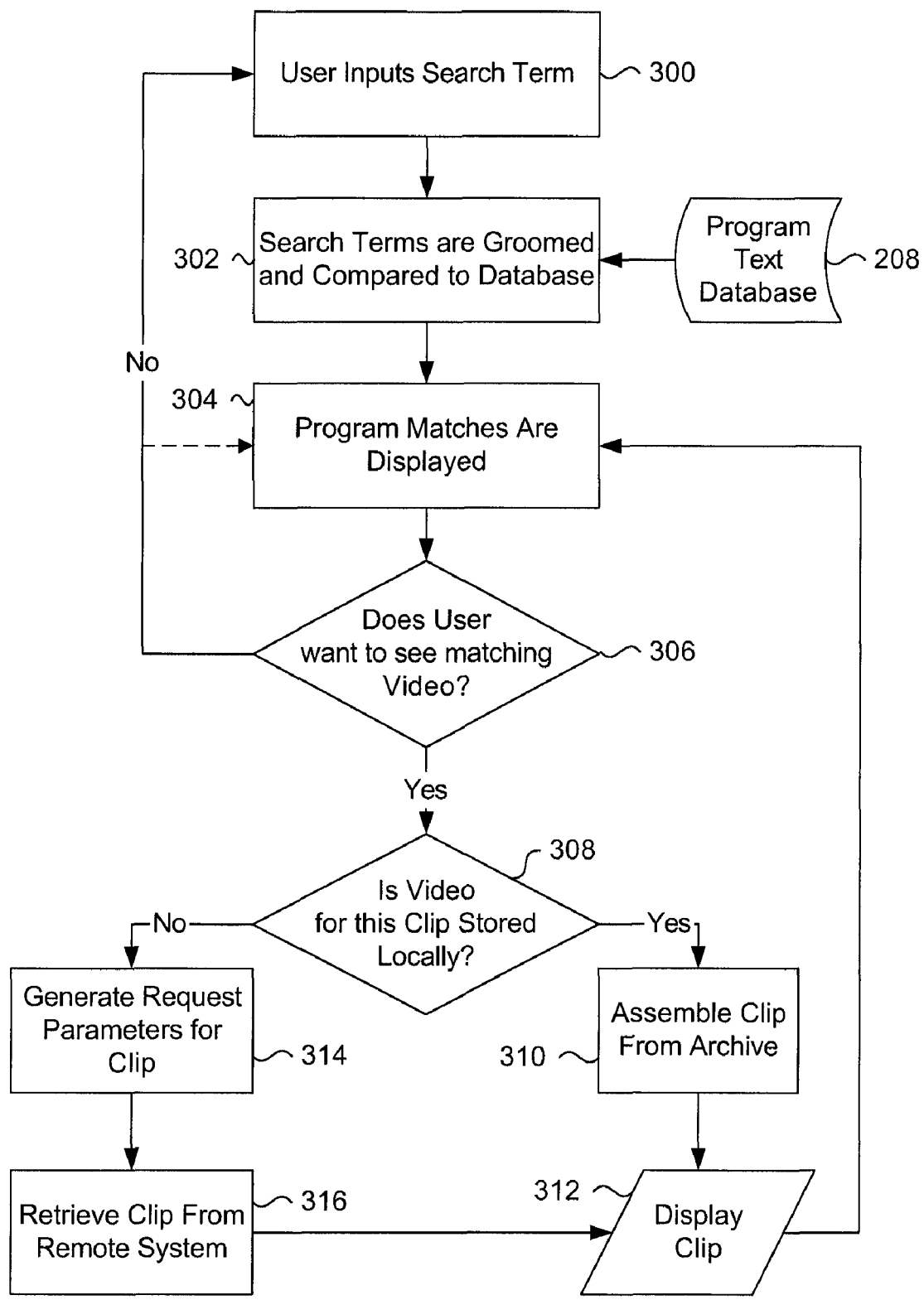
FIG. 4 is a flow chart illustrating a manual operation mode of the media monitoring system of the present invention.

Following is an example of a common interactive mode of operation between a user and the media monitoring system 100 shown in FIG. 1. FIG. 4 shows a flow chart of the process executed by the media monitoring system 100, while FIGS. 5-8 are examples of user interface screens that prompt the user for information and display results to the user.

Figures 5, 6:
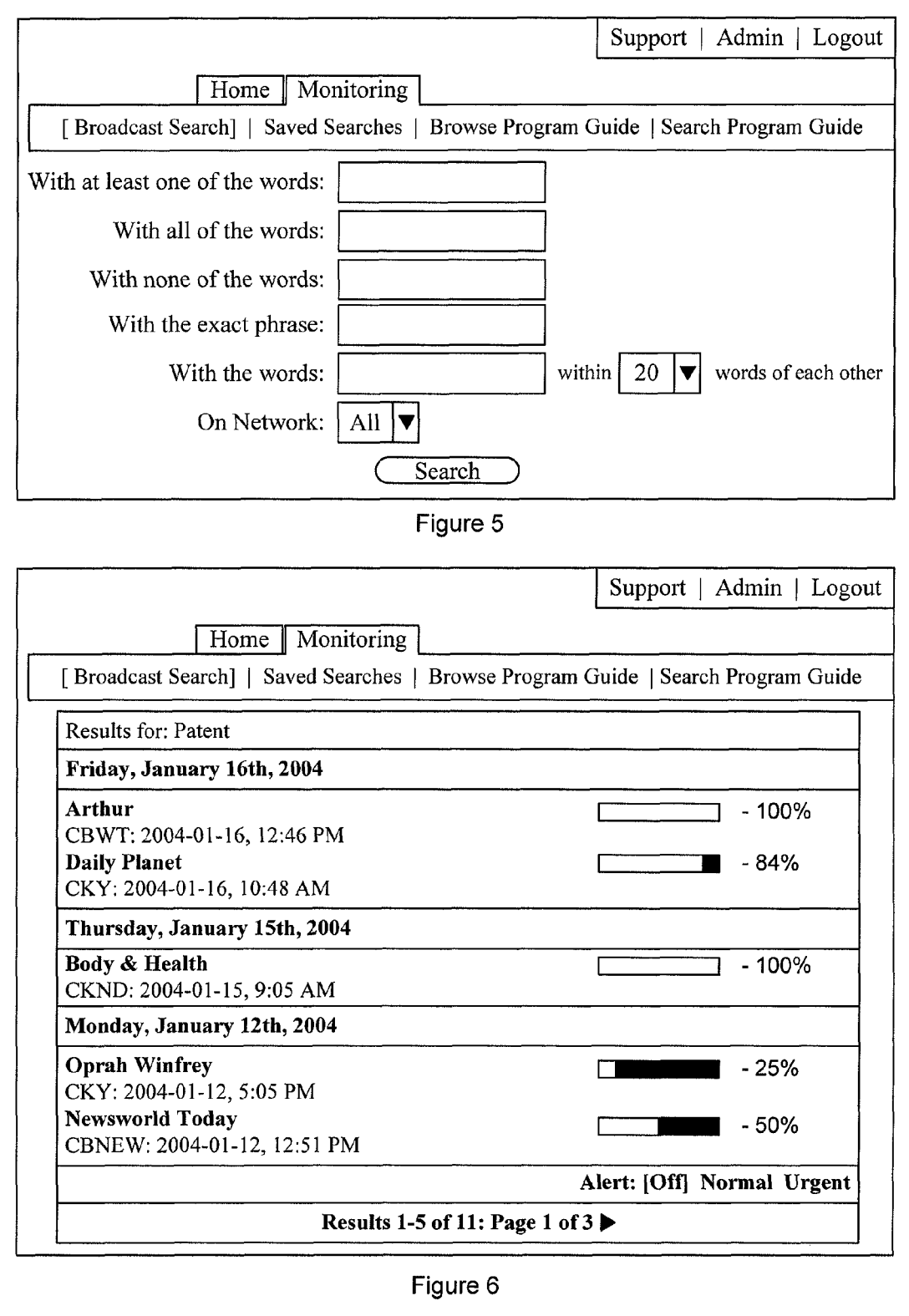

The process begins at step 300, where the user logs into the interface with the goal of researching a topic's appearance in the recent media. The user is presented with a screen that allows them to enter the search terms that would match their desired content. Common search parameters are provided, such as specifying phrases that must appear as typed, words that should appear within a certain distance of each other, boolean queries, etc. As well, the query can be limited to only return results from specific broadcast channels. FIG. 5 is an example user interface for prompting the search parameters from the user.

Upon submitting the form, the search parameters provided by the user are first groomed at step 302. Grooming is an optional step, which refers to optimization of the search parameters, especially if the user's search parameters are broken. For example, the user may enter "red blue" in the MUST CONTAIN THESE WORDS search field, and "GREEN" in the MAY CONTAIN search field. The grooming process then optimizes the search parameters to "GREEN RED AND BLUE". The groomed search parameters are compared to database 208 that stores all the closed captioned text. The user is presented with a match results page at step 304, itemizing the results obtained, the programs they appeared in, and a score that represents how strong the match was. The results can be sorted in numerous ways, such as by date, by program name, or by score. A compact example results page is shown in FIG. 6, and a more detailed version is shown in FIG. 7. In both the compact and detailed results pages, the user can select any row to view further details of that program segment. The results pages shown in FIGS. 6 and 7 may list concurrent segments belonging to the same broadcast, since the search term appears in each segment. For example, the results may return "Channel Y, 6:00pm to 6:01pm", "Channel Y, 6:01pm to 6:02pm" and "Channel Y, 6:02pm to 6:03pm" as separate program segment items. The system can optimize the results by recognizing that the three segments are chronological segments of Channel Y, and collapse the results into a simplified description, such as "Channel Y, 6:00 pm to 6:03 pm".

Upon selecting a program segment at step 306, the user is presented with a caption viewing screen showing the matching captioning and timing information, as shown in FIG. 8. The present screen gives the user the option of viewing the clip associated with the shown extracted closed captioned text. From the caption viewing screen, the user is also presented with a navigation system that allows the user to move forward or backward in the video stream beyond the matched segment, to peruse the context that the clip was presented in. The caption viewing screen also features controls to compose a video clip that consists of several consecutive units of video. More specifically, the user has the ability to define the start and end points of a video clip, and then view or save that clip. This is suitable for preparing a salient clip that is to be saved for future reference.

If the user chooses not to view the corresponding video clip at step 306, the process can return to step 300 to restart the search. Optionally, the process can return to step 304 to permit the user to view the results page and select a different program segment. If the user chooses to view the corresponding video clip, then the system determines if the video clip is stored locally at step 308. It is important to note that a locally stored video clip refers to one that is accessible via a high bandwidth network, which is typically available in a local area network, such as in an office environment. In contrast, remotely stored video clips are generally available only through a low bandwidth network, or one that is too low to have a copy of all video sent to it all the time. As previously discussed, the user can access the video remotely over a low bandwidth connection. Therefore, the process provides a video access method optimized according to whether or not the user is accessing the system remotely. If the video clip is stored locally, ie. on a high bandwidth connection suitable for streaming video, then the system proceeds to step 310. At step 310, the video clip is retrieved and assembled with the appropriate video segments, and then displayed for the user at step 312. The video clip can be played with the user's preferred video playing software. Alternately at step 308, if the video clip is not stored locally, the system proceeds to step 314, where a query is sent to the specific remote server that will return the video that the user is asking for. The video clip is retrieved from the remote system at step 316, and finally displayed for the user at step 312. Once the clip has ended, the user has the option of returning to step 304 to view another program segment. Alternately, the user may return to step 300 to initiate a new search.

Some installations and user devices (such as WiFi or Bluetooth wireless devices) do not have the ability to view video clips. In this scenario, the video clip can be ordered through the user interface where it will be delivered to the user via email, via a link to a web site, or a physical medium such as a DVD, CD or video cassette for example. This service is suitable for clients requiring a permanent copy of especially important video segments.

The previously described manual interactive operation method of FIG. 4 is effective for searching and viewing archived video. According to an embodiment of the present invention, the media monitoring system 100 can concurrently operate in an automatic scanning mode to match user defined terms with real time extracted closed captioned text. The user can selectively activate the alerting system to provide notification for specific terms.

As previously described, searches can be stored by users so that they are executed on all incoming text corresponding to real-time recorded video. Any matches will selectively generate an immediate alert, which can be communicated to the user by various means. Selective generation of an alert refers to the fact that the user can set specific search terms to trigger an alert when matched. The stored search terms are archived in a search term database, preferably located on web servers, 114 including parameters reflecting the desired level of alerting the user has requested. Examples of such alerting levels can include "Never alert me", "alert me by putting a message in the product", "and alert me urgently by sending me an email to my mobile device".

Figure 9:
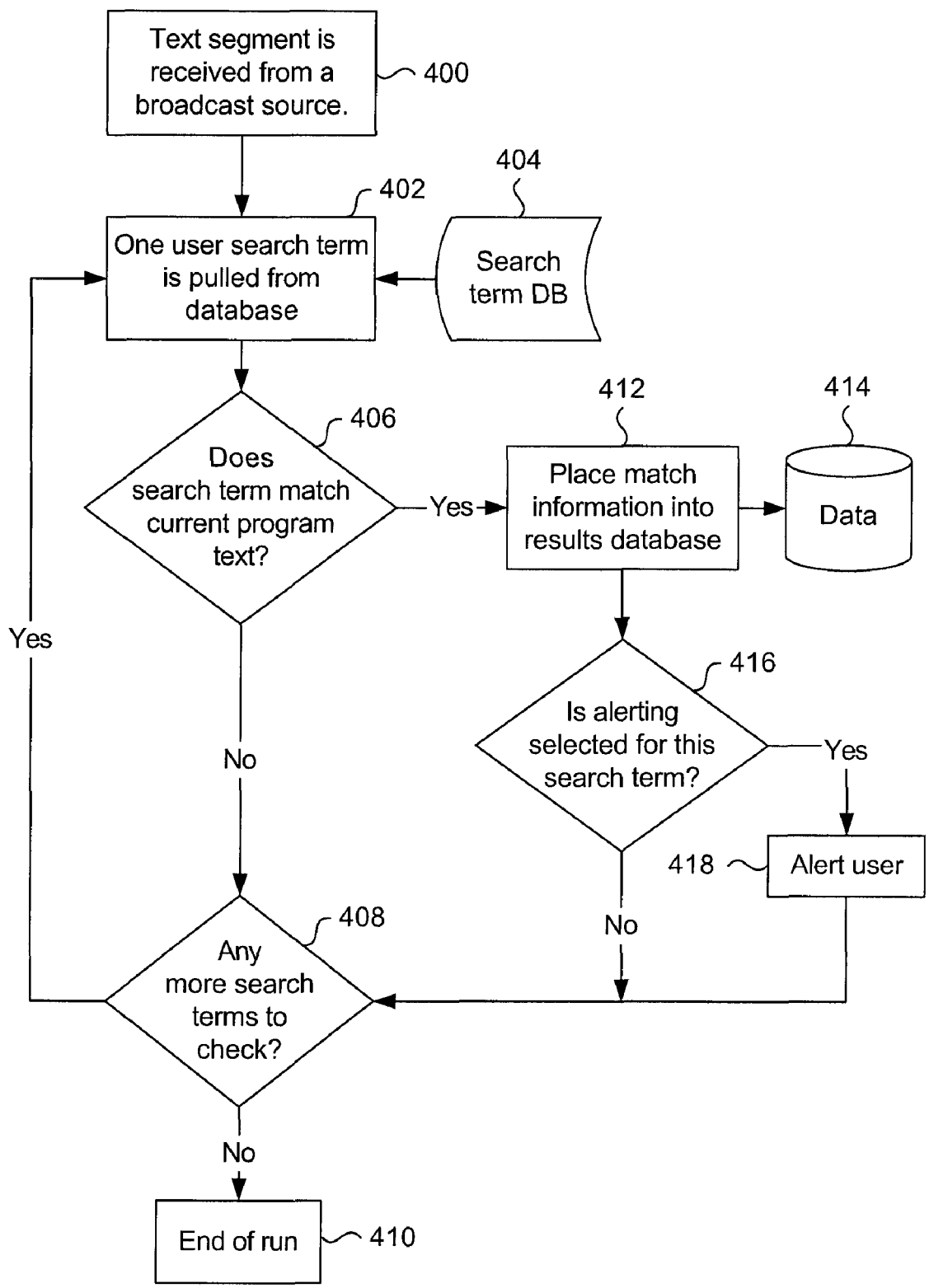

The automatic scanning mode method of operation of the media monitoring system 100 is described with reference to FIG. 9. It is assumed that the following process operates upon each stored unit of program text after the text is stored and indexed. Then the index is searched again with the terms to detect if anything new appears. It is further assumed that the user has previously defined his/her search terms and stored them in a search term database 404, which can be physically located on web server 114. The process begins at step 400, where the text from index database 212 for the unit is retrieved. At step 402, a search term from the users search term database 404 is retrieved and compared to the stored unit of program text at step 406. If there is an absence of a match, the system proceeds to step 408, where the system checks if there are any further search terms to check against the stored unit of program text. If there are no more search terms, the process ends at step 410. Otherwise, the system loops back to step 402 to fetch the next search term.

If a match was found at step 406, the system proceeds to step 412 to store the match information in a results database 414. This results database is preferably located in web server 114, and is local to the user's portal. The results summarize matches between the search terms and the video clips for the user when they log in to their portal. At step 416, the system checks if the user has activated an alert, for the present search term. If an alert has been activated for the present search term, the system generates a notification message for the user at step 418, in accordance with their desired alert level. Depending on settings and system configuration, this alert/notification can be delivered using a number of methods, including but not limited to, alerts in the interface, via email, via mobile and wireless devices, for example. Once the user has been alerted at step 418, or if no alert has been activated for the present search term at step 416, the matched search result processing the system proceeds to step 408 to determine if there are any further search terms. This aforementioned process is executed for each unit of program text stored in the index.

Therefore, should the user add a new search term to his/her search term database at a later time, the media monitoring system of the present invention can immediately search the archives to identify any prior program segments that match the new search term, and monitor new program segments for occurrences of the new search term.

The system described in this application stores all video from all channels, allowing searches to be refined or changed at will with instant results. As well, learnings from the results of one query can be incorporated into a new search with instant results.

This invention improves the user experience by storing and indexing all recent video and captions. This allows not only unlimited queries with real time results, but also allows new searches inspired by results to be performed immediately and with instant results.

The aforementioned embodiments of the present invention records and stores video/audio clips that are broadcast across any number of channels. There are instances where the same video clips are broadcast by affiliated channels. An example includes all those channels affiliated with CTV. Hence, there is a great likelihood that a user's search parameters will return duplicate video clips. In an enhancement to the embodiments of the present invention, web server 114 can include a duplicate video clip detector to mark matching video clip results that are essentially the same. This function can be executed in web servers 114 as search results are returned to the user. For example, the text of the returned search results can be scanned such that the duplicates are marked as such. This feature allows the user to view one video clip and dismiss those marked as duplicates very quickly, without opening each one and viewing the clip. Preferably, the duplicate video clip detector can be implemented on web server 114, but can be executed in index servers 110. Generally, a first matching result is added to the database and then fuzzy matching is executed to determine if further matches are essentially the same as the first stored instance. If so, then the duplicates are marked as such for the users' convenience. Those of skill in the art should understand that an essential match between two clips is one where a substantial percentage of the content are the same. Naturally, this percentage can be preset by the system administrator.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A media monitoring system for receiving at least one video channel having corresponding closed captioned text in real time, comprising:
   a storage medium for containing at least one of stored search terms for conducting an alert search and provided search terms for conducting an archival search;
   a media management system for continuously storing all the data of the at least one video channel locally and for extracting the corresponding closed captioned text into decoded text, the decoded text being provided to a global storage database, the media management system having
   a search engine for comparing the decoded text against at least one of the stored search terms and the provided search terms to provide matching results during the alert search and the archival search, and
   an indexing engine for indexing units of the decoded text by time; and
   a media server pod for receiving the at least one video channel and for locally storing the data of the at least one video channel, the media server pod including a close caption decoder for extracting the corresponding closed captioning text into the decoded text,
   an index server for receiving the decoded text from the media server pod over a first network, the index servers having the index engine, and
   a web server including the global storage database for storing the decoded text received from the index servers over a second network, the web servers having the search engine and a search term database for storing the at least one of stored search terms and provided search terms, and
   a user access system for receiving and displaying the matching results, the user access system transmitting a request for stored data corresponding to specific units of the decoded text from the media management system, the media management system providing said stored data corresponding to specific units of the decoded text in response to the request.

2. The media monitoring system of claim 1, wherein the media server pod includes at least one media source for providing the at least one video channel, and a media server in direct communication with the at least one media source for receiving the at least one video channel, the media server having a decoder for extracting the corresponding closed captioned text into decoded text from a vertical blanking interval of the at least one video channel, the media server including mass storage media for storing the data of the at least one video channel.

3. The media monitoring system of claim 2, wherein the media server includes a parser for generating the stored data corresponding to specific units of the decoded text.

4. The media monitoring system of claim 2, wherein the media server pod includes a plurality of media sources for providing a corresponding number of video channels.

5. The media monitoring system of claim 2, wherein the media server includes a video/audio compression system for compressing the data of the at least one video channel prior to storage onto the mass storage media.

6. The media monitoring system of claim 5, wherein the media server includes a speech-to-text system for converting audio signals corresponding to the at least one video channel into text.

7. The media monitoring system of claim 5, wherein the media server includes a text detector for detecting an absence of the corresponding closed captioned text, the text detector generating an alert indicating the absence of the corresponding closed captioned text.

8. The media monitoring system of claim 2, wherein the media source includes one of a satellite receiver, a cable box, an antenna, and a digital radio source.

9. The media monitoring system of claim 1, wherein the index server includes the global storage database.

10. The media monitoring system of claim 1, wherein the web server includes the global storage database.

11. The media monitoring system of claim 2, wherein the first network includes a wide area network.

12. The media monitoring system of claim 11, wherein the media management system further includes a second media server pod for receiving data of a different video channel, the second media server pod being in communication with the first network.

13. The media monitoring system of claim 12, wherein the media server pod and the second media server pod are geographically distant from each other.

14. The media monitoring system of claim 1, wherein the user access system includes a duplicate video clip detector for identifying the matching results that are duplicates of each other.

15. The media monitoring system of claim 1, wherein the user access system includes a user access device in communication with the web server over a third network, for receiving and displaying the matching results.

16. The media monitoring system of claim 15, wherein the user access system includes a fourth network in communication with the user access device and the media server pod, the user access device receiving said stored data corresponding to specific units of the decoded text in response to the request over the fourth network.

17. The media monitoring system of claim 15, wherein the user access device provides the at least one of the stored search terms and the provided search terms to the media management system.

\* \* \* \* \*